US012738623B2

(12) United States Patent
Kwon et al.

(10) Patent No.: US 12,738,623 B2
(45) Date of Patent: Sep. 15, 2026

(54) COUPLER AND MANUFACTURING METHOD THEREFOR

(71) Applicant: RN2 TECHNOLOGIES CO., LTD., Hwaseong-si (KR)

(72) Inventors: Dong Hyeok Kwon, Hwaseong-si (KR); Jae Hong Choi, Hwaseong-si (KR); Jae Hyun Kim, Hwaseong-si (KR); Hyo Jong Lee, Hwaseong-si (KR); Jeom Gug Yook, Hwaseong-si (KR)

(73) Assignee: RN2 TECHNOLOGIES CO., LTD., Hwaseong-si (KR)

( * ) Notice: Subject to any disclaimer, the term of this patent is extended or adjusted under 35 U.S.C. 154(b) by 124 days.

(21) Appl. No.: 18/799,663

(22) Filed: Aug. 9, 2024

(65) Prior Publication Data

US 2025/0385419 A1 Dec. 18, 2025

(30) Foreign Application Priority Data

Jun. 14, 2024 (KR) ........................ 10-2024-0077413

(51) Int. Cl.
*H01P 5/12* (2006.01)
*H01Q 1/36* (2006.01)
*H01Q 1/48* (2006.01)

(52) U.S. Cl.
CPC ................. *H01P 5/12* (2013.01); *H01Q 1/36* (2013.01); *H01Q 1/48* (2013.01)

(58) Field of Classification Search
CPC ............... H01P 5/12; H01Q 1/48; H01Q 1/36
USPC ........................................................... 333/136
See application file for complete search history.

(56) References Cited

U.S. PATENT DOCUMENTS 6,917,796 B2 * 7/2005 Setty .................... H03D 7/1408 455/333
9,166,549 B2 10/2015 Imamura
12,451,582 B2 * 10/2025 Seok .................... H03H 7/0115

FOREIGN PATENT DOCUMENTS

CN 103684327 A 3/2014
KR 101310745 B1 * 9/2013 .............. H01P 5/184
KR 10-2014-0072570 A 6/2014

OTHER PUBLICATIONS

KR101310745B1 English Translation (Year: 2013).*

* cited by examiner

*Primary Examiner* — Andrea Lindgren Baltzell
*Assistant Examiner* — Abigail Amir Yaldo

(57) ABSTRACT

The present invention relates to a coupler. The coupler may include a coupler body including ground electrodes and port electrodes for external power connection; a ground pattern located inside the coupler body and electrically connected to the ground electrodes; a coupling line located inside the coupler body and electrically connected to the port electrodes; and a feeding line located inside the coupler body and configured to connect the feeding line and the port electrodes and increase a capacitance component of the coupling line, wherein the coupling line and the feeding line are connected to each other through a plurality of internal via holes each having a first cross-sectional area, and the feeding line has a second cross-sectional area that satisfies a range of 4 to 150 times the first cross-sectional area.

18 Claims, 32 Drawing Sheets

COUPLER AND MANUFACTURING METHOD THEREFOR

CROSS-REFERENCE TO RELATED PATENT APPLICATION

This application claims the benefit of Korean Patent Application No. 10-2024-0077413, filed on Jun. 14, 2024, in the Korean Intellectual Property Office, the disclosure of which is incorporated herein in its entirety by reference.

STATEMENT REGARDING SPONSORED RESEARCH OR DEVELOPMENT

The research and development of the present invention were conducted with the support of the Korea Technology & Information Promotion Agency for SMEs, TIPA) with the financial resources of the Ministry of SMEs and Startups (Project Number: S3367505, Detailed Project identifier: 1425177387).

BACKGROUND OF THE INVENTION

1. Field of the Invention

The following description relates to a coupler, and more specifically, to a coupler that does not include an upper ground pattern but has a specific type of feeding line capable of compensating for the reduction in capacitance caused by the absence of the upper ground pattern, as well as to a manufacturing method therefor.

2. Description of the Related Art

In a wireless communication system, a repeater of a base station transmits data signals by sending them at high output, and a coupler is used to combine, separate, and receive the signals of increased output.

The coupling amount of a coupler may be adjusted by the coupling area and spacing of coupling lines. A coupler may have a configuration where the length of the coupling line is one-fourth of the wavelength (λ/4) of the signal's central frequency, and this configuration is the basic structure of the coupler. Couplers that include coupling lines with a length of wavelength/4 (λ/4) are easy to implement and can be easily combined with other millimeter-wave or microwave devices, thus they are widely used.

SUMMARY OF THE INVENTION

The frequency band and trend of the global communication market generally require higher frequencies and miniaturization of products. Conventional couplers have a structure in which coupling lines are located between the upper ground pattern and the lower ground pattern. As the frequency of a coupler increases, the length of the coupling lines becomes shorter, and there are limitations in implementing the width (interlayer thickness) and spacing between the coupling lines. Consequently, there are limitations in achieving a stronger coupling strength.

In addition, since the width and spacing of the coupling lines are determined to implement the required impedance, it is difficult to increase the characteristics of the coupler, such as insertion loss. Moreover, since the current flowing in adjacent lines are in opposite directions, electromagnetic interference occurs, which can degrade the characteristics of the coupler, such as insertion loss.

The present invention is to address the aforementioned problems and to provide a coupler which is capable of improving amplitude balance, enhancing isolation, and reducing reflection loss and insertion loss, while increasing the coupling value of coupling lines, by excluding an upper ground pattern. However, this object is merely illustrative and does not limit the scope of the present invention.

According to one embodiment of the present invention, a coupler is provided.

The coupler may include a coupler body including ground electrodes and port electrodes for external power connection; a ground pattern located inside the coupler body and electrically connected to the ground electrodes; a coupling line located inside the coupler body and electrically connected to the port electrodes; and a feeding line located inside the coupler body and configured to connect the feeding line and the port electrodes and increase a capacitance component of the coupling line, wherein the coupling line and the feeding line may be connected to each other through a plurality of internal via holes each having a first cross-sectional area, and the feeding line may have a second cross-sectional area that satisfies a range of 4 to 150 times the first cross-sectional area.

According to one embodiment of the present invention, the feeding line may be located between the ground pattern and the coupling line.

According to one embodiment of the present invention, the feeding line may be positioned such that one side thereof overlaps with at least a portion of the coupling line and the other side thereof overlaps with at least a portion of the ground pattern.

According to one embodiment of the present invention, the ground pattern may be positioned on either an upper side or a lower side, but only on one side, relative to the coupling line within the coupler body.

According to one embodiment of the present invention, the coupling line may include a first coupling line at least a portion of which is formed as a spiral line; and a second coupling line is formed in a shape corresponding to the first coupling line.

According to one embodiment of the present invention, the first coupling line may include a first spiral line formed in a shape wound in one direction; and a second spiral line formed in a shape wound in an opposite direction to the first spiral line.

According to one embodiment of the present invention, the first spiral line may include: a 1-1st line connected to the port electrode; a 1-2nd line extending in a direction bent at a predetermined angle from the 1-1st line; a 1-3rd line extending in a direction bent at a predetermined angle from the 1-2st line; and a 1-4th line extending in a direction bent at a predetermined angle from the 1-3rd line.

According to one embodiment of the present invention, the 1-3rd line may be formed to have a thicker width than the 1-2nd line or the 1-4th line.

According to one embodiment of the present invention, the feeding line may include a first feeding line formed in an overall rectangular shape and configured to electrically connect the 1-1st spiral line and a first port electrode.

According to one embodiment of the present invention, the first feeding line may be connected to the 1-1st spiral line at a portion corresponding to one edge and to the first port electrode at a portion corresponding to the other edge opposite to the one edge.

According to one embodiment, the ground pattern may be formed in an overall rectangular shape with a hollow center.

According to one embodiment of the present invention, the coupling line may be positioned to overlap with at least a portion of the ground pattern.

According to one embodiment of the present invention, the coupling line may be positioned in the center of the ground pattern so as not to overlap with the ground pattern.

According to one embodiment of the present invention, the coupler body may include: a second sheet including the ground pattern; a third sheet including the feeding line; a fourth sheet including the first coupling line; and a fifth sheet including the second coupling line.

According to one embodiment of the present invention, the ground electrodes and the port electrodes may be formed on a bottom surface of the coupler body, the ground electrodes and the ground pattern may be connected to each other through a plurality of ground via holes, and the port electrodes and the feeding line may be electrically connected to each other through a plurality of internal via holes.

According to one embodiment of the present invention, the coupler body may further include a first sheet including the ground electrodes and the port electrodes.

According to one embodiment of the present invention, the ground electrodes and the port electrodes may be formed to wrap around at least a portion of one side or the other side of the coupler body, the ground pattern may be directly connected to the ground electrodes, and the feeding line may be directly connected to the port electrodes.

According to one embodiment of the present invention, a manufacturing method for a coupler is provided.

The manufacturing method may include the steps of: (a) preparing a second sheet including a ground pattern; (b) stacking a third sheet including a feeding line on one surface of the second sheet; (c) stacking a fourth sheet including a first coupling line on one surface of the third sheet; (d) stacking a fifth sheet including a second coupling line on one surface of the fourth sheet; and (e) sintering the second to fifth sheets through a Low Temperature Co-fired Ceramic (LTCC) process to form a coupler body, wherein the first coupling line and the feeding line may be connected to each other through a plurality of internal via holes each having a first cross-sectional area, and the feeding line may be formed to have a second cross-sectional area that satisfies a range of 4 to 150 times the first cross-sectional area.

According to one embodiment of the present invention, the manufacturing method may further include, before step (a), (f) preparing a first sheet including ground electrodes and port electrodes for external power connection on the other surface of the second sheet, wherein step (e) may be a step of sintering the first to fifth sheets to form a coupler body.

According to one embodiment of the present invention, the manufacturing method may further include, after step (e), (g) preparing ground electrodes and pot electrodes; and (h) coupling the ground electrodes and the port electrodes to the coupler body such that they wrap around at least a portion of one side or the opposite side of the coupler body, while the ground pattern and the coupling lines are directly connected to the ground electrodes and the port electrodes, respectively.

BRIEF DESCRIPTION OF THE DRAWINGS

The above and other features and advantages of the present invention will become more apparent by describing in detail embodiments thereof with reference to the attached drawings in which.

DETAILED DESCRIPTION OF THE INVENTION

Figure 1:
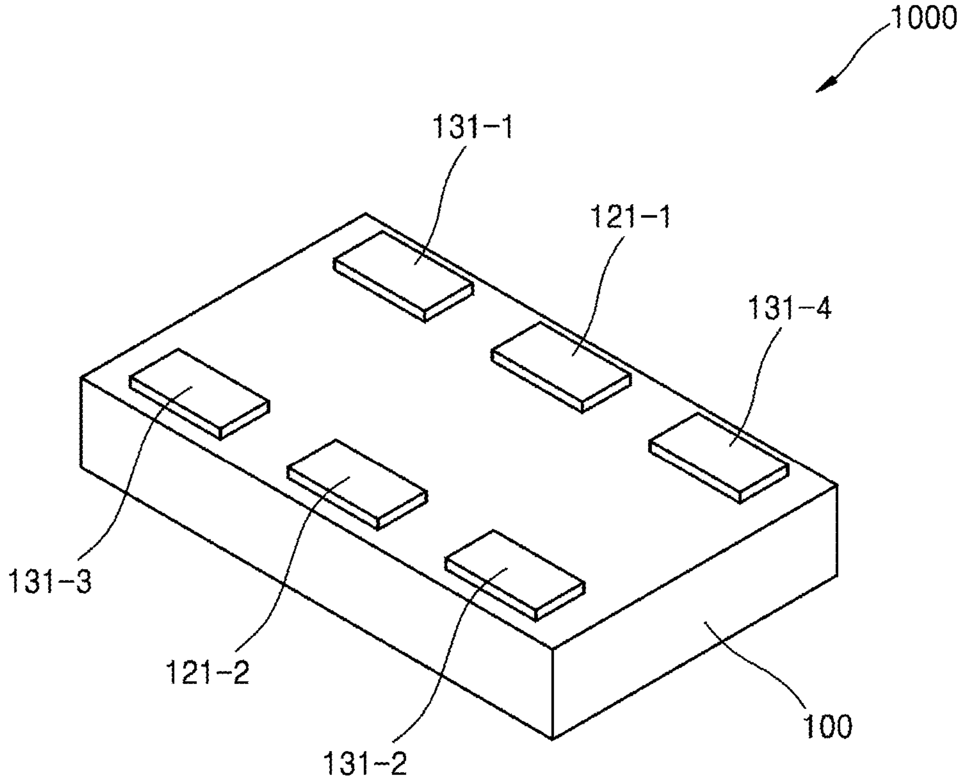
FIG. 1 is a perspective view schematically showing the rear surface structure of a coupler body as viewed from below, according to an embodiment of the present invention.

Hereinafter, exemplary embodiments of the present invention will be described in detail with reference to the accompanying drawings.

The invention may, however, be embodied in many different forms and should not be construed as being limited to the embodiments set forth herein; rather, these embodiments are provided so that this disclosure will be thorough and complete, and will fully convey the concept of the invention to one of ordinary skill in the art. In the drawings, the width or sizes of layers are exaggerated for clarity and convenience of explanation.

Hereinafter, the present disclosure will be described more fully with reference to the accompanying drawings, in which exemplary embodiments of the present disclosure are shown. In the drawings, for example, according to the manufacturing techniques and/or tolerances, shapes of the illustrated elements may be modified. Thus, the present disclosure should not be construed as being limited to the embodiments set forth herein, and should include, for example, variations in the shapes caused during manufacturing.

As used in the specification, the terms “top (upper)” and “bottom (lower)” are used to indicate a relative positional relationship, not an absolute positional relationship. These terms are defined based on the direction in which each sheet is stacked within a coupler body. When lines or patterns “overlap,” it refers to the presence or absence of an overlapping area with respect to the stacking direction.

FIG. 1 is a perspective view of the rear surface of a coupler 1000 as viewed from below, according to an embodiment of the present invention, showing the rear surface structure of a first sheet 100 in FIG. 17, which will be described further below. Referring to FIG. 1, a coupler body may be composed of a rectangular or square ceramic dielectric, and on its rear surface, a plurality of port electrodes 131-1, 131-2, 131-3, and 131-4 and a plurality of ground electrodes 121-1 and 121-2 are formed.

The coupler body may be formed by combining a plurality of sheets, as described below, and may be formed by a low temperature co-fired ceramic (LTCC) process. The LTCC process involves making a material mixed with glass and ceramic into a thin form called a green sheet (ceramic tape), cutting it into multiple pieces, forming metal conductors such as gold, silver, or copper on each green sheet according to the role of simple electrodes or components, and then baking fired ceramic and metal simultaneously by applying each green sheet according to the desired shape. The multiple sheets will be described in detail below with reference to FIGS. 2 to 15.

Figure 2:
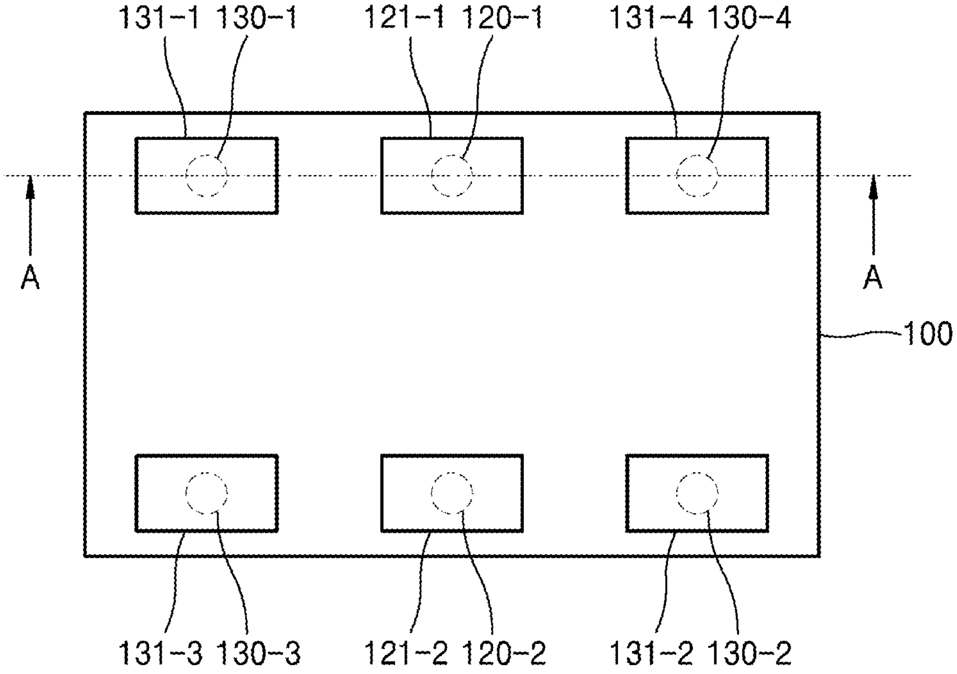
FIG. 2 is a plan view showing a bottom surface of a first sheet according to an embodiment of the present invention.
Figure 3:
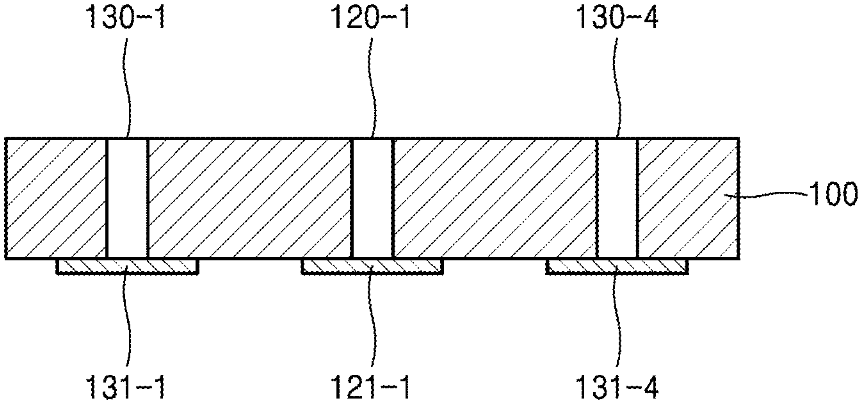
FIG. 3 is a cross-sectional view of the first sheet taken along section A-A of FIG. 2.

As shown in FIGS. 2 and 3, a first sheet 100 may include a plurality of port via holes 130-1, 130-2, 130-3, and 130-4, a plurality of ground via holes 120-1 and 120-2, a plurality of port electrodes 131-1, 131-2, 131-3, and 131-4, and a plurality of ground electrodes 121-1 and 121-2. The first sheet 100 may include an insulating material, for example, a ceramic material.

The port electrodes 131-1, 131-2, 131-3, and 131-4 and the ground electrodes 121-1 and 121-2 may include a conductive material, and may be formed by applying conductive paste onto the first sheet. In addition, the port electrodes 131-1, 131-2, 131-3, and 131-4 and the ground electrodes 121-1 and 121-2 may be formed by applying a conductive material to the coupler body after forming the coupler body using the LTCC process.

The plurality of port electrodes 131-1, 131-2, 131-3, and 131-4 and the plurality of ground electrodes 121-1 and 121-2 may be formed on the lower surface of the coupler body. For example, the plurality of port via holes 130-1, 130-2, 130-3, and 130-4 may each be formed at the edges of the first sheet 100, and the plurality of port electrodes 131-1, 131-2, 131-3, and 131-4 may be formed at positions corresponding to the plurality of port via holes 130-1, 130-2, 130-3, and 130-4.

The plurality of ground via holes 120-1 and 120-2 may be formed between the plurality of port via holes 130-1, 130-2, 130-3, and 130-4. For example, a 1-1st ground via hole 120-1 may be formed between a 1-1st port via hole 130-1 and a 1-4th port via hole 130-4, and a 1-2nd ground via hole 120-2 may be formed between a 1-2nd port via hole 130-2 and a 1-3rd port via hole 130-3. The plurality of ground electrodes 121-1 and 121-2 may be formed at positions corresponding to the plurality of ground via holes 120-1 and 120-2.

The plurality of port electrodes 131-1, 131-2, 131-3, and 131-4 and the plurality of ground electrodes 121-1 and 121-2 may also be formed on the upper surface of the coupler 1000, and depending on the purpose of use, the plurality of port electrodes 131-1, 131-2, 131-3, and 131-4 and the plurality of ground electrodes 121-1 and 121-2 may be formed only on the upper surface of the coupler body.

Figure 4:
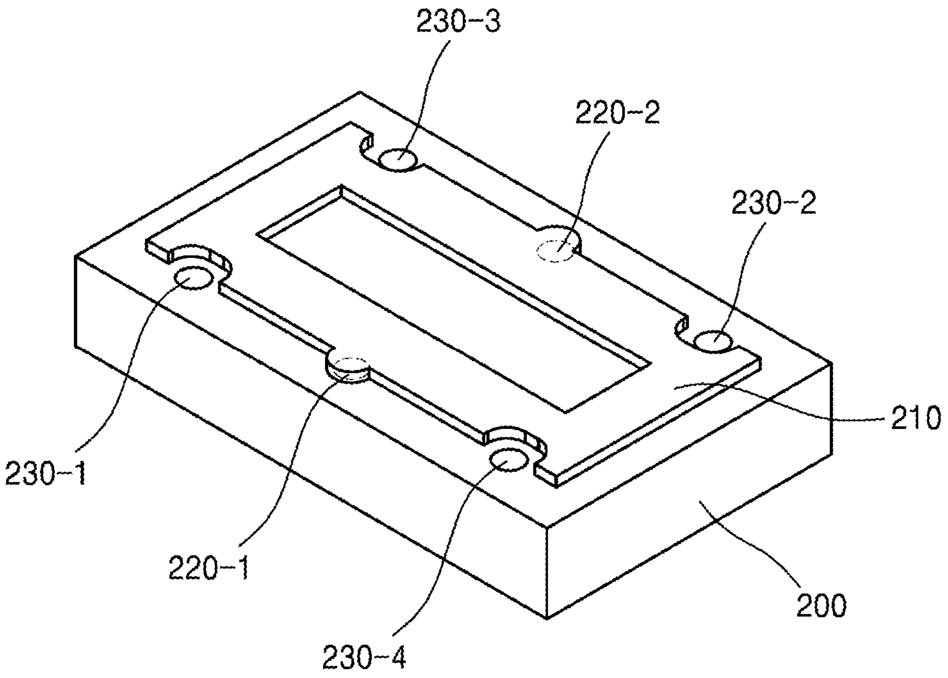
FIG. 4 is a perspective view schematically showing a second sheet according to an embodiment of the present invention.
Figure 5:
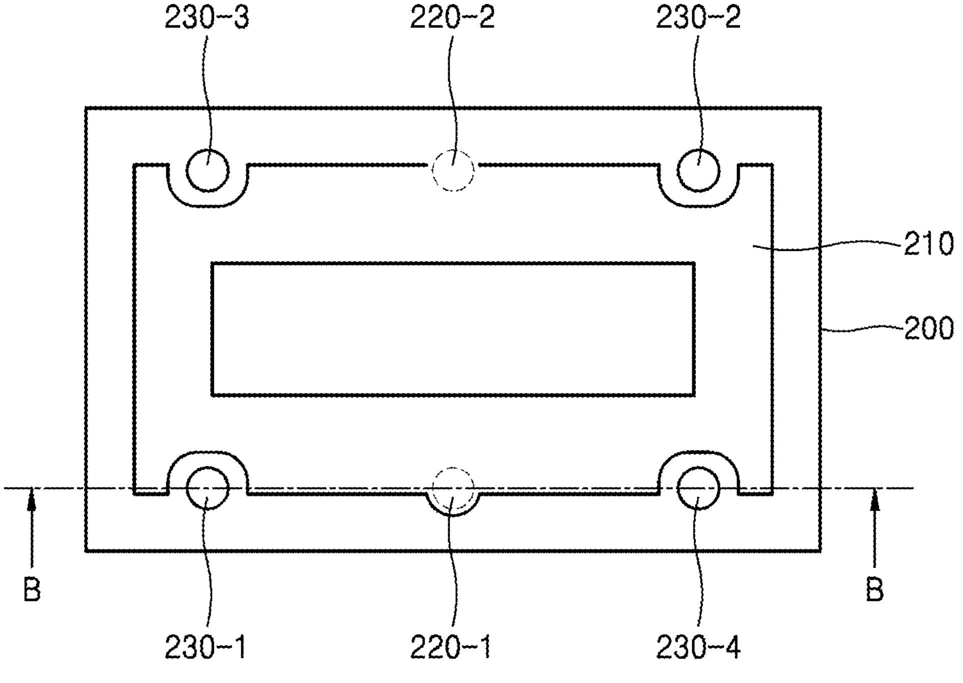
FIG. 5 is a plan view showing a top surface of the second sheet according to an embodiment of the present invention.
Figure 6:
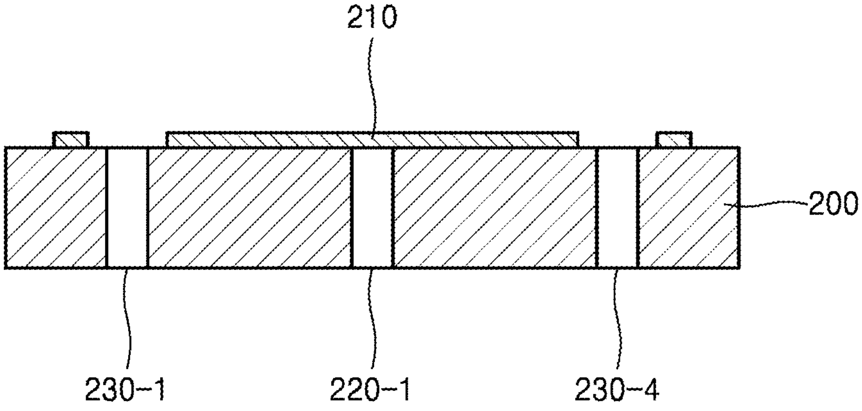
FIG. 6 is a cross-sectional view of the second sheet taken along section B-B of FIG. 5.

As shown in FIGS. 4 to 6, a second sheet 200 may include a plurality of port via holes 230-1, 230-2, 230-3, and 230-4, a plurality of ground via holes 220-1 and 220-2, and a ground pattern 210. The second sheet 200 may include an insulating material, for example, a ceramic material. The ground pattern 210 may include a conductive material and may be formed, for example, by a deposition method, by attaching a conductive sheet, or by applying conductive paste onto the second sheet.

Referring to FIG. 5, the ground pattern 210 may be formed in an overall symmetrical shape. For example, the ground pattern 210 may be formed symmetrically left and right or up and down with respect to the center of the rectangular-shaped second sheet 200.

For example, as shown in FIG. 5, the ground pattern 210 may be formed in an overall rectangular shape with a hollow center. In this case, the ground pattern 210 may include concavely curved sections at positions corresponding to each of the port via holes 230-1, 230-2, 230-3, and 230-4 so that it is not electrically or physically connected to the port via holes 230-1, 230-2, 230-3, and 230-4.

The ground pattern 210 may be electrically or physically connected to at least a portion of the plurality of ground via holes 220-1 and 220-2. For example, the ground pattern 210 may be electrically or physically connected to a 2-1st ground via hole 220-1 and a 2-2nd ground via hole 220-2 that are positioned opposite to each other.

The plurality of port via holes 230-1, 230-2, 230-3, and 230-4 and the plurality of ground via holes 220-1 and 220-2 formed on the second sheet 200 may be electrically or physically connected to the plurality of port via holes 130-1, 130-2, 130-3, and 130-4 and the plurality of ground via holes 120-1 and 120-2 formed on the first sheet 100, respectively.

In a more specific example, as shown in FIG. 5, one edge of the ground pattern 210 formed in an overall rectangular shape with a hollow center may be electrically or physically connected to the 2-1st ground via hole 220-1. However, at positions corresponding to a 2-1st port via hole 230-1 and a 2-4th port via hole 230-4, it is formed to be rounded towards the center portion of the ground pattern 210 so that it is not electrically or physically connected to the 2-1st port via hole 230-1 and the 2-4th port via hole 230-4.

Figure 7:
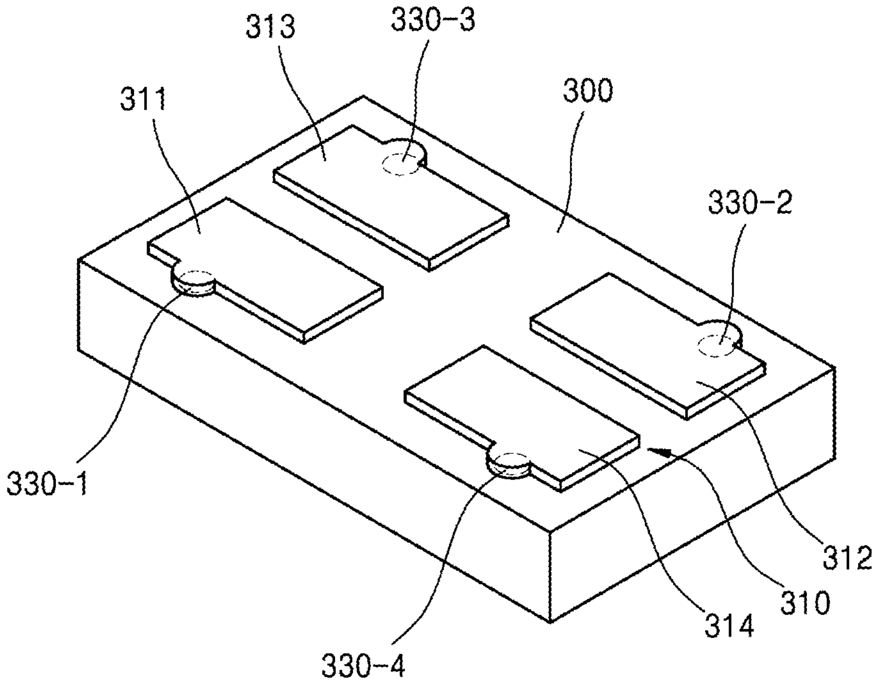
FIG. 7 is a perspective view schematically showing a third sheet according to an embodiment of the present invention.
Figure 8:
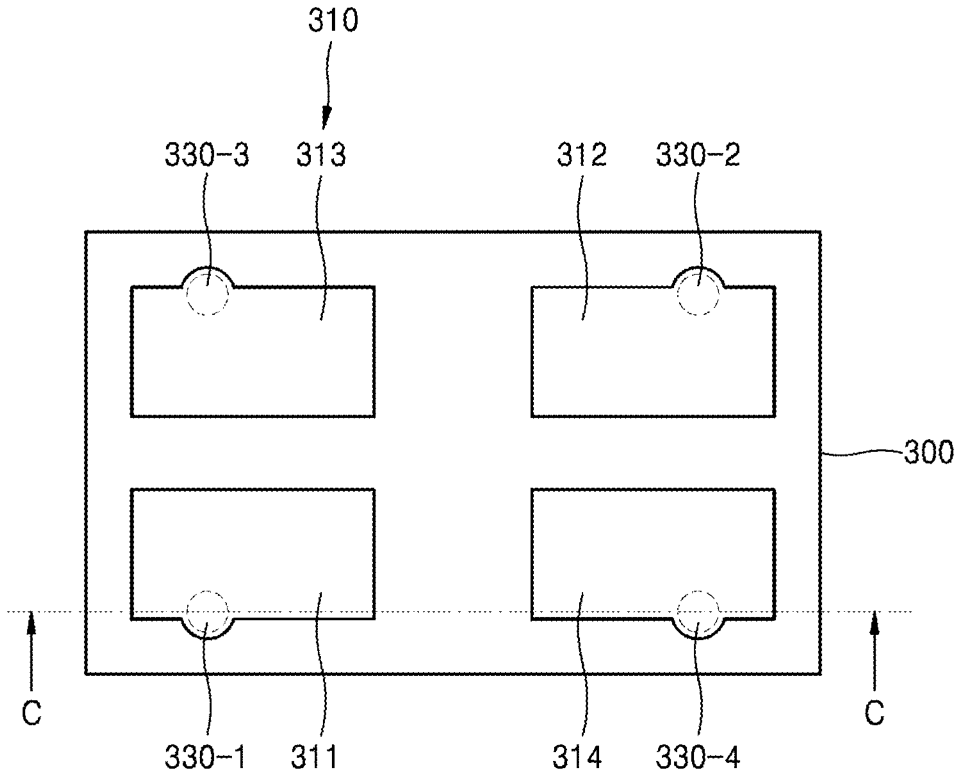
FIG. 8 is a plan view showing a top surface of the third sheet according to an embodiment of the present invention.
Figure 9:
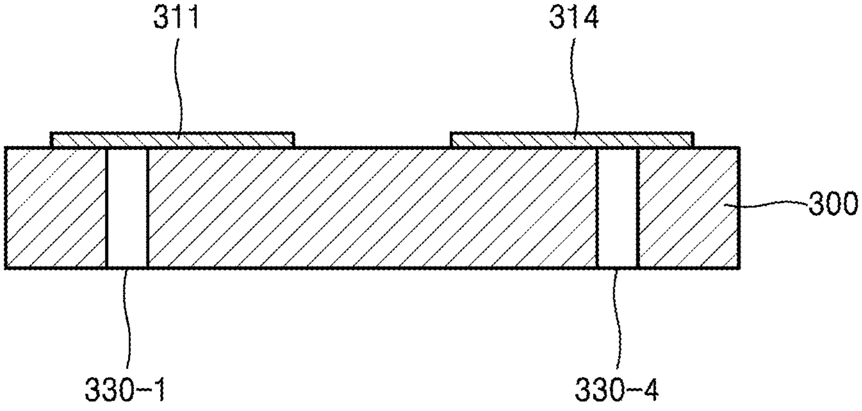
FIG. 9 is a cross-sectional view of the third sheet taken along section C-C of FIG. 8.

As shown in FIGS. 7 to 9, a third sheet 300 may include a plurality of port via holes 330-1, 330-2, 330-3, and 330-4, and a feeding line 310. The third sheet 300 may include an insulating material, for example, a ceramic material. The feeding line 310 may include a conductive material and may be formed, for example, by a deposition method, by attaching a conductive sheet, or by applying conductive paste onto the third sheet.

Referring to FIG. 8, the feeding line 310 may include a first feeding line 311, a second feeding line 312, a third feeding line 313, and a fourth feeding line 314. In this case, the first feeding line 311, the second feeding line 312, the third feeding line 313, and the fourth feeding line 314 may be electrically or physically connected to a 3-1st port via hole 330-1, a 3-2nd port via hole 330-2, a 3-3rd port via hole 330-3, and a 3-4th port via hole 330-4, respectively. Additionally, each of the feeding lines 311, 312, 313, and 314 may be arranged to be spaced apart from each other at a predetermined distance.

For example, the shapes of the feeding lines 311, 312, 313, and 314 may be formed in an overall rectangular shape, but are not limited to this and may be formed in various shapes such as circular, elliptical, or polygonal shapes. At this time, the feeding lines 311, 312, 313, and 314 are respectively connected to a plurality of internal via holes 420-1, 420-2, 420-3, and 420-4 shown in FIG. 10 to be described below, and may be formed to have a second cross-sectional area that satisfies the range of 4 to 150 times a first cross-sectional area of the plurality of internal via holes 420-1, 420-2, 420-3, and 420-4. The first cross-sectional area is the area of one internal via hole, and the second cross-sectional area may be the area of one feeding line. The description of these numerical limits will be provided below with reference to FIGS. 23 to 30.

Figure 10:
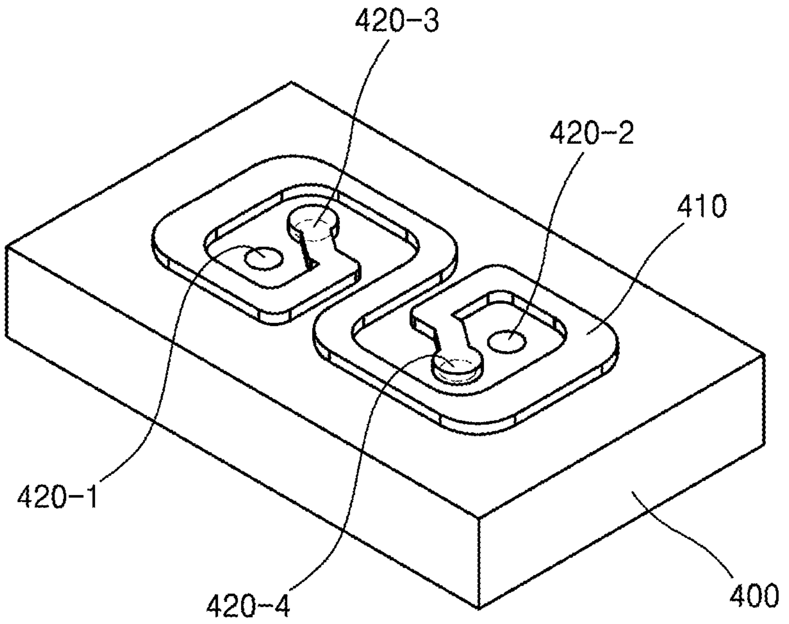
FIG. 10 is a perspective view schematically showing a fourth sheet according to an embodiment of the present invention.
Figure 11:
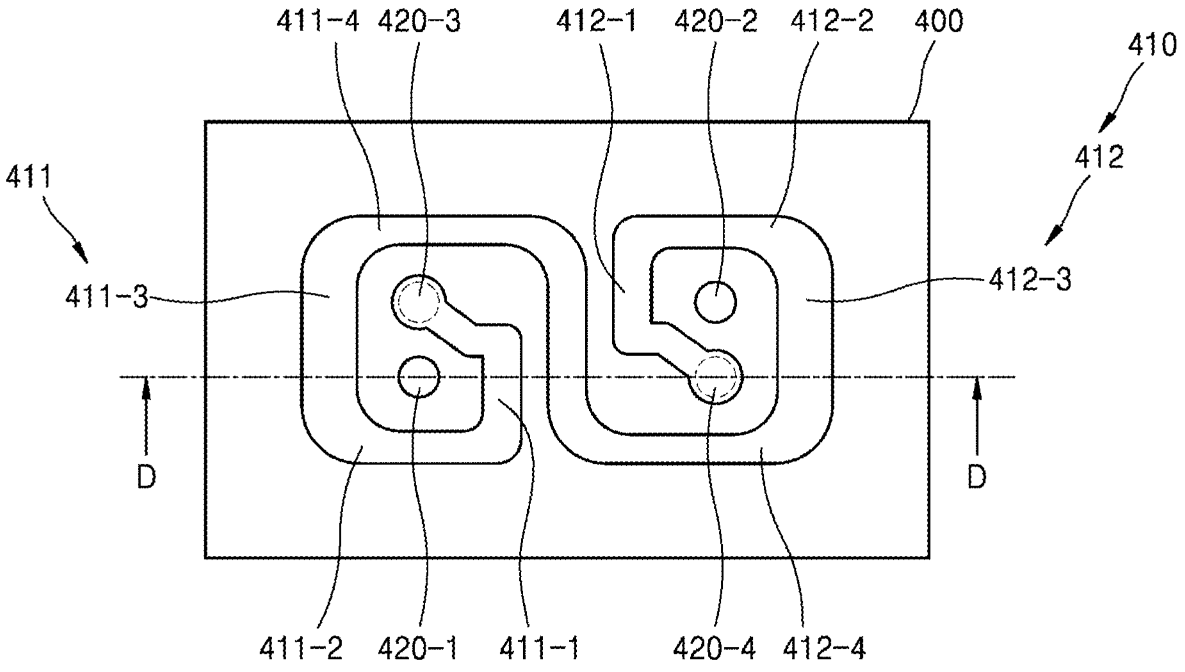
FIG. 11 is a plan view showing a top surface of the fourth sheet according to an embodiment of the present invention.
Figure 12:
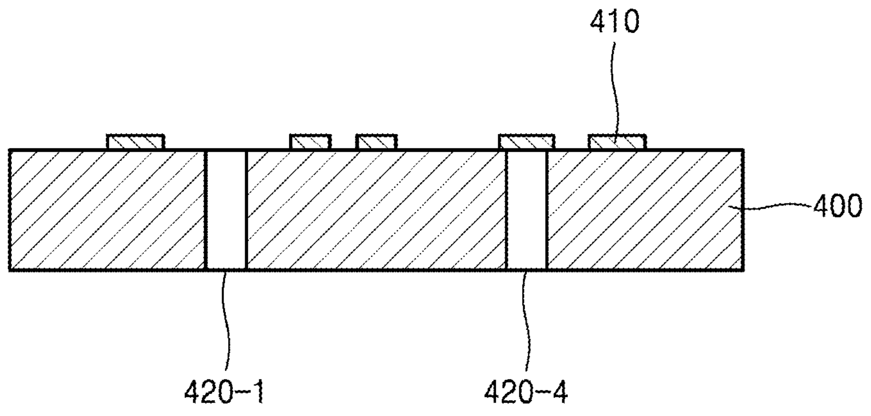
FIG. 12 is a cross-sectional view of the fourth sheet taken along section D-D of FIG. 11.

As shown in FIGS. 10 to 12, a fourth sheet 400 may include the plurality of internal via holes 420-1, 420-2, 420-3, and 420-4 and a first coupling line 410. The fourth sheet 400 may include an insulating material, for example, a ceramic material. The first coupling line 410 may include a conductive material and may be formed, for example, by a deposition method, by attaching a conductive sheet, or by applying conductive paste onto the fourth sheet.

Referring to FIG. 11, the first coupling line 410 may be electrically or physically connected to any one of the plurality of internal vial holes 420-1, 420-2, 420-3, and 420-4. For example, one side of the first coupling line 410 may be electrically or physically connected to a 1-3rd internal via hole 420-3, and the other side of the first coupling line 410 may be electrically or physically connected to a 1-4th internal via hole 420-2.

In addition, the first coupling line 410 may include a first spiral line 411 formed in a shape wound in one direction and a second spiral line 412 formed in a shape wound in the opposite direction to the first spiral line 411. The one direction may be clockwise.

More specifically, the first spiral line 411 may include a 1-1st line 411-1 connected to the 1-3rd internal via hole 420-3, a 1-2nd line 411-2 extending in a direction bent at a predetermined angle from the 1-1st line 411-1, a 1-3rd line 411-3 extending in a direction bent at a predetermined angle from the 1-2nd line 411-2, and a 1-4th line 411-4 extending in a direction bent at a predetermined angle from the 1-3rd line 411-3. Therefore, the first spiral line 411 may have an overall spiral structure that is wound in a clockwise direction.

Additionally, the second spiral line 412 may include a 2-1st line 412-1 connected to the 1-4th internal via hole 420-4, a 2-2nd line 412-2 extending in a direction bent at a predetermined angle from the 2-1st line 412-1, a 2-3rd line 412-3 extending in a direction bent at a predetermined angle from the 2-2nd line 412-2, and a 2-4th line 412-4 extending in a direction bent at a predetermined angle from the 2-3rd line 412-3. Therefore, the second spiral line 412 may have an overall spiral structure that is wound in a counterclockwise direction.

In this case, the 1-3rd line 411-3 of the first spiral line 411 may be formed to have a thicker width than the 1-1st line 411-1, the 1-2nd line 411-2, or the 1-4th line 411-4.

The plurality of internal via holes 420-1, 420-2, 420-3, and 420-4 formed on the fourth sheet 400 may be electrically or physically connected to the feeding lines 311, 312, 313, and 314 formed on the third sheet 300, respectively.

For example, the third feeding line 313 formed in a rectangular shape on the third sheet 300 may be connected to the 1-3rd internal via hole 420-3 at a portion corresponding to one edger and to the 3-3rd port via hole 330-3 at a portion corresponding to the opposite edge.

Figure 13:
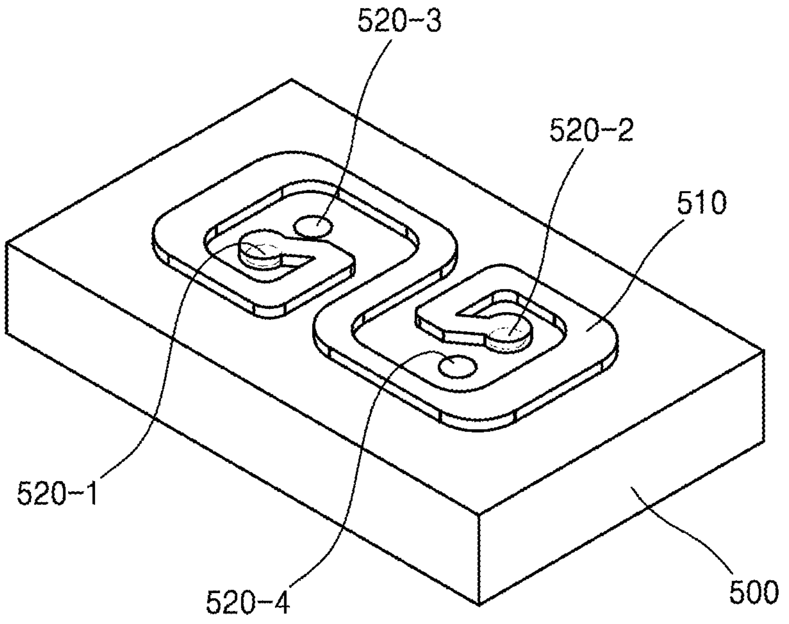
FIG. 13 is a perspective view schematically showing a fifth sheet according to an embodiment of the present invention.
Figure 14:
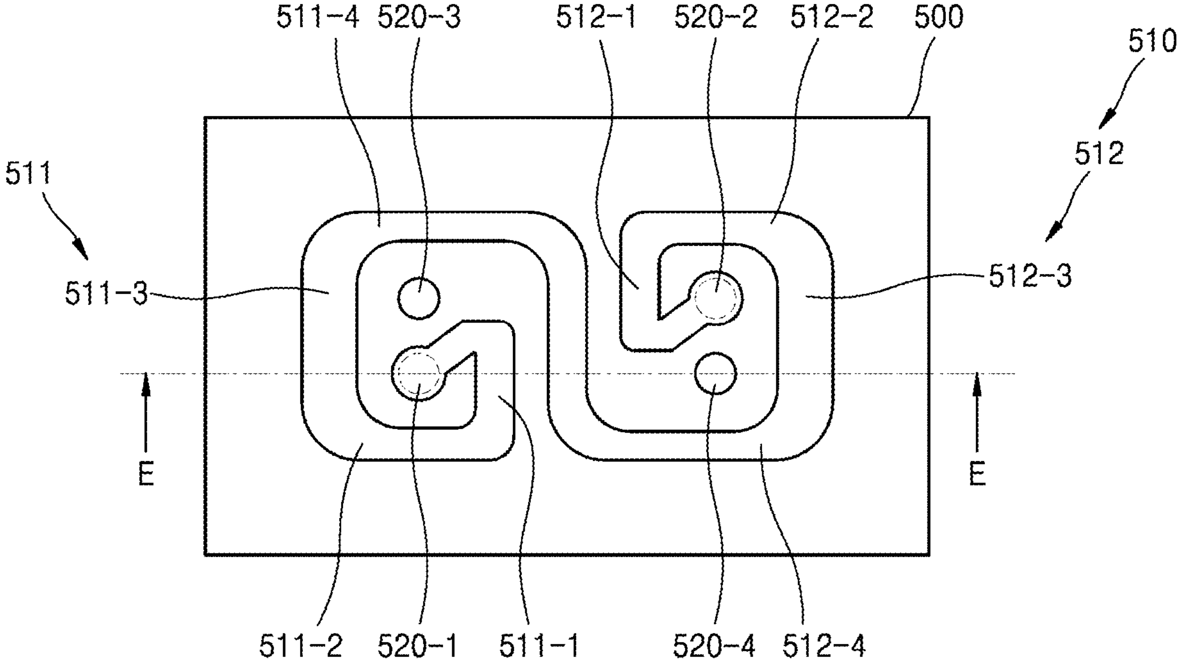
FIG. 14 is a plan view showing a top surface of the fifth sheet according to an embodiment of the present invention.
Figure 15:
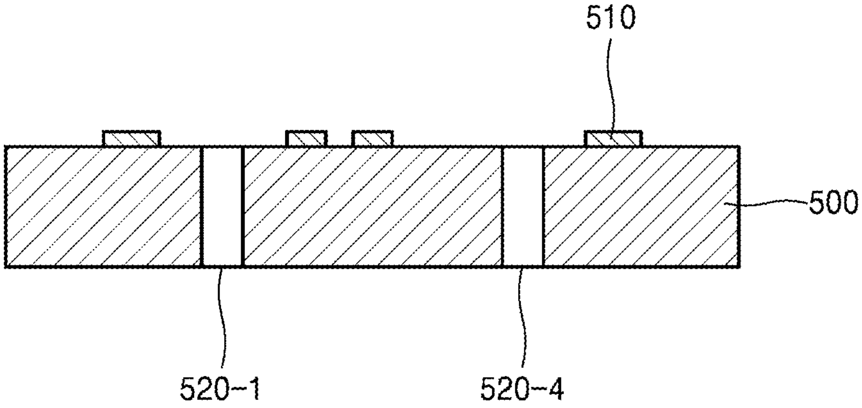
FIG. 15 is a cross-sectional view of the fifth sheet taken along section E-E of FIG. 14.

As shown in FIGS. 13 to 15, a fifth sheet 500 may include a plurality of internal via holes 520-1, 520-2, 520-3, and 520-4 and a second coupling line 510. The fifth sheet 500 may include an insulating material, for example, a ceramic material. The second coupling line 510 may include a conductive material and may be formed, for example, by a deposition method, by attaching a conductive sheet, or by applying conductive paste onto the fifth sheet.

Referring to FIG. 14, the second coupling line 510 may be electrically or physically connected to any one of the plurality of internal vial holes 520-1, 520-2, 520-3, and 520-4. For example, one side of the second coupling line 510 may be electrically or physically connected to a 2-1st internal via hole 520-1, and the other side of the second coupling line 510 may be electrically or physically connected to a 2-2nd internal via hole 520-2.

In addition, the second coupling line 510 may include a third spiral line 511 formed in a shape wound in one direction and a fourth spiral line 512 formed in a shape wound in the opposite direction to the third spiral line 511. The one direction may be clockwise.

More specifically, the third spiral line 511 may include a 3-1st line 511-1 connected to the 2-1st internal via hole 520-1, a 3-2nd line 511-2 extending in a direction bent at a predetermined angle from the 3-1st line 511-1, a 3-3rd line 511-3 extending in a direction bent at a predetermined angle from the 3-2nd line 511-2, and a 3-4th line 511-4 extending in a direction bent at a predetermined angle from the 3-3rd line 511-3. Therefore, the third spiral line 511 may have an overall spiral structure that is wound in a clockwise direction.

Additionally, the fourth spiral line 512 may include a 4-1st line 512-1 connected to the 2-2nd internal via hole 520-2, a 4-2nd line 512-2 extending in a direction bent at a predetermined angle from the 4-1st line 512-1, a 4-3rd line 512-3 extending in a direction bent at a predetermined angle from the 4-2nd line 512-2, and a 4-4th line 512-4 extending in a direction bent at a predetermined angle from the 4-3rd line 512-3. Therefore, the fourth spiral line 512 may have an overall spiral structure that is wound in a counterclockwise direction.

In this case, the 3-3rd line 511-3 of the third spiral line 511 may be formed to have a thicker width than the 3-1st line 511-1, the 3-2nd line 511-2, or the 3-4th line 511-4, and the 4-3rd line 512-3 of the fourth spiral line 512 may be formed to have a thicker width than the 4-1st line 512-1, the 4-2nd line 512-2, or the 4-4th line 512-4.

In this case, the second coupling line 410 may be formed in a shape corresponding to the first coupling line 310 to induce effective interference with the first coupling line 310.

The plurality of internal via holes 520-1, 520-2, 520-3, and 520-4 formed on the fifth sheet 500 may be electrically or physically connected to the plurality of internal via holes 420-1, 420-2, 420-3, and 420-4 formed on the fourth sheet 400, respectively.

For example, the first feeding line 311 formed in a rectangular shape on the third sheet 300 may be connected to the 1-1st internal via hole 420-1 and the 2-1st internal via hole 520-1 at a portion corresponding to one edge, and to the 3-1st port via hole 330-1 at a portion corresponding to the opposite edge.

Figure 16:
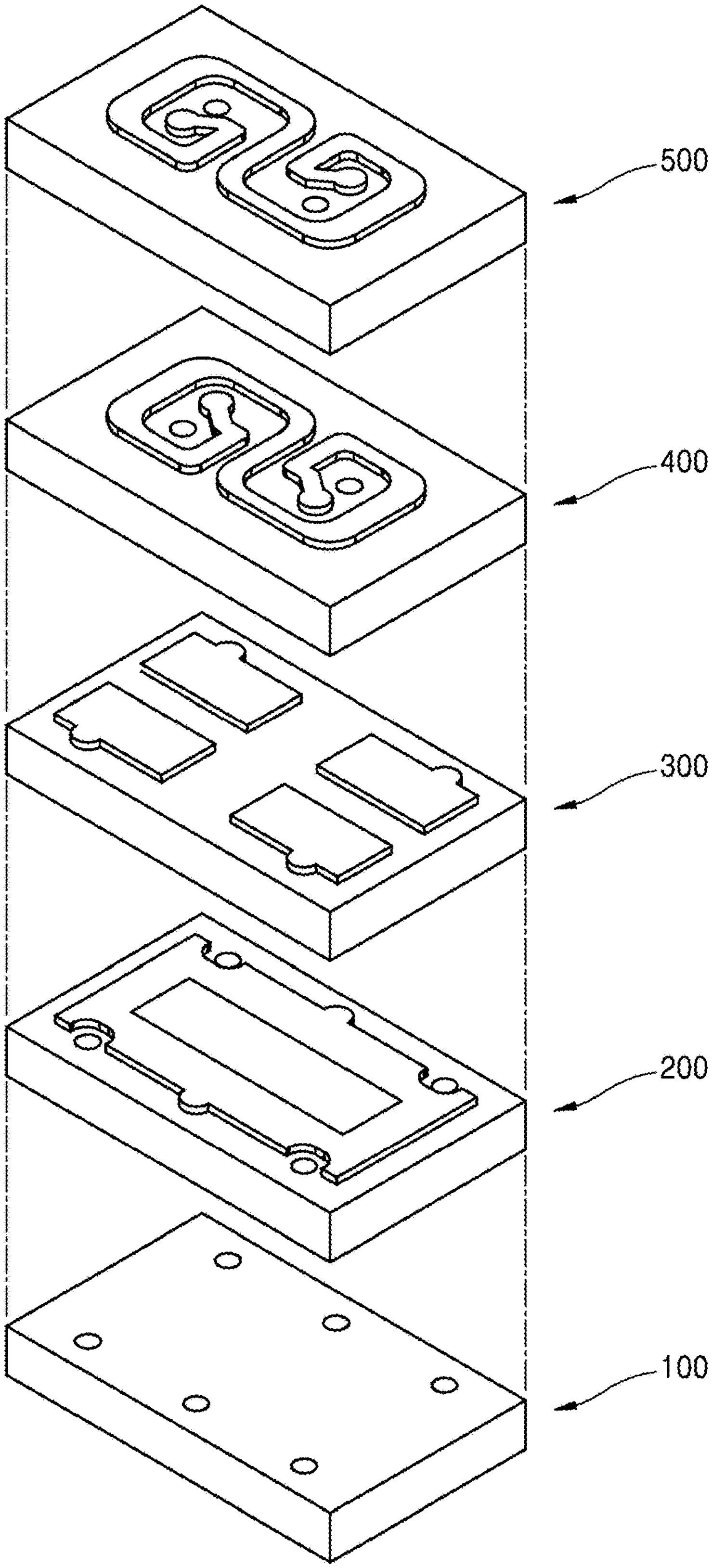
FIG. 16 is an exploded perspective view of a coupler according to an embodiment of the present invention.

Referring to FIG. 16, the coupler 1000 according to an embodiment of the present invention is formed by sequentially stacking the first to fifth sheets 100, 200, 300, 400, and 500. The coupler 1000 may be formed using the LTCC process as described above. Each sheet may also be stacked in an inverted orientation.

As shown in FIG. 16, the first to fifth sheets 100, 200, 300, 400, and 500 may be sequentially stacked, and the plurality of port via holes 130-1, 130-2, 130-3, and 130-4 and the plurality of ground via holes 120-1 and 120-2 formed on the first sheet 100 may be electrically or physically connected to the plurality of port via holes 230-1, 230-2, 230-3, and 230-4 and the plurality of ground via holes 220-1 and 220-2 formed on the second sheet 200, respectively. Additionally, the plurality of internal via holes 420-1, 420-2, 420-3, and 420-4 formed on the fourth sheet 400 may be electrically or physically connected to the plurality of internal via holes 520-1, 520-2, 520-3, and 520-4 formed on the fifth sheet 500.

Additionally, the ground pattern 210 formed on the second sheet 200 and the feeding line 310 formed on the third sheet 300 may be formed to at least partially overlap with each other.

Moreover, the ground pattern 210 and the first coupling line 410 and second coupling line 510 formed on the fourth sheet 400 and fifth sheet 500, respectively, may be formed so as not to overlap with the ground pattern 210. For example, the first coupling line 410 and the second coupling line 510 may be formed to be placed in the empty center of the ground pattern 210. Additionally, depending on the required characteristic values of the coupler, it is also possible to form the first coupling line 410 and the second coupling line 510 to overlap at least partially with the ground pattern 210.

Furthermore, the first coupling line 410 and the second coupling line 510 may be formed to overlap at least partially with the feeding line 310. For example, the 1-2nd line 411-2 of the first coupling line 410 may be formed to overlap with the first feeding line 311, and the 1-4th line 411-4 may be formed to overlap with the third feeding line 313.

Figure 17:
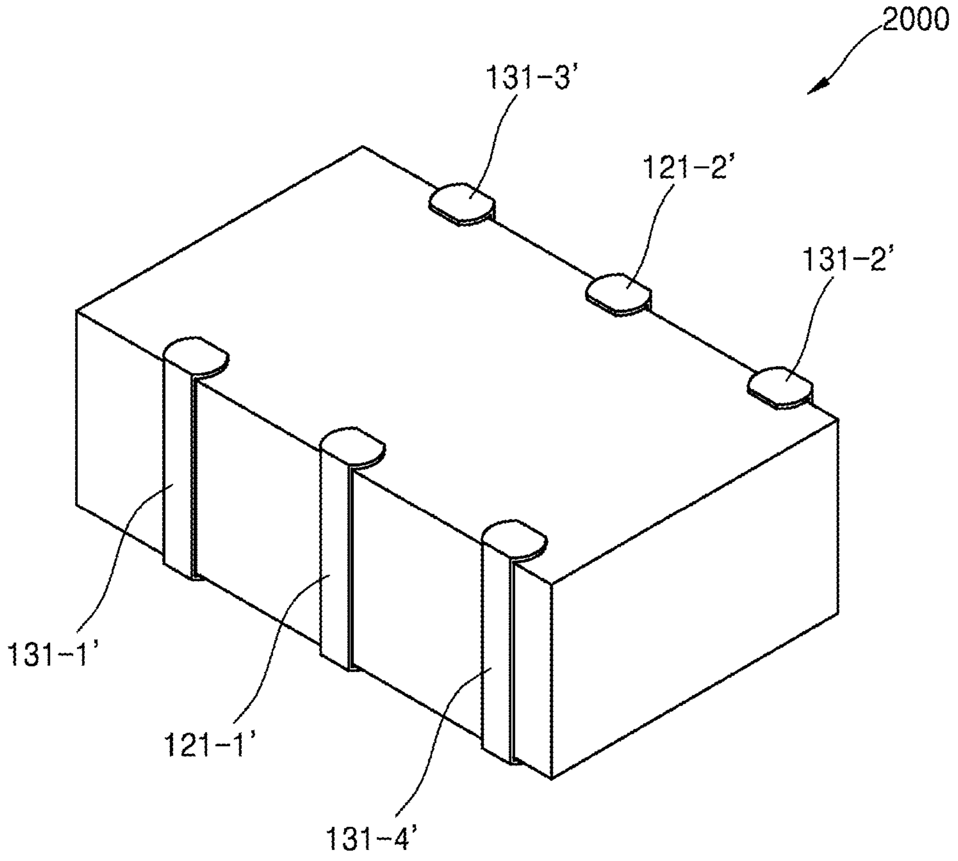
FIG. 17 is a perspective view schematically showing a coupler according to another embodiment of the present invention.
Figure 18:
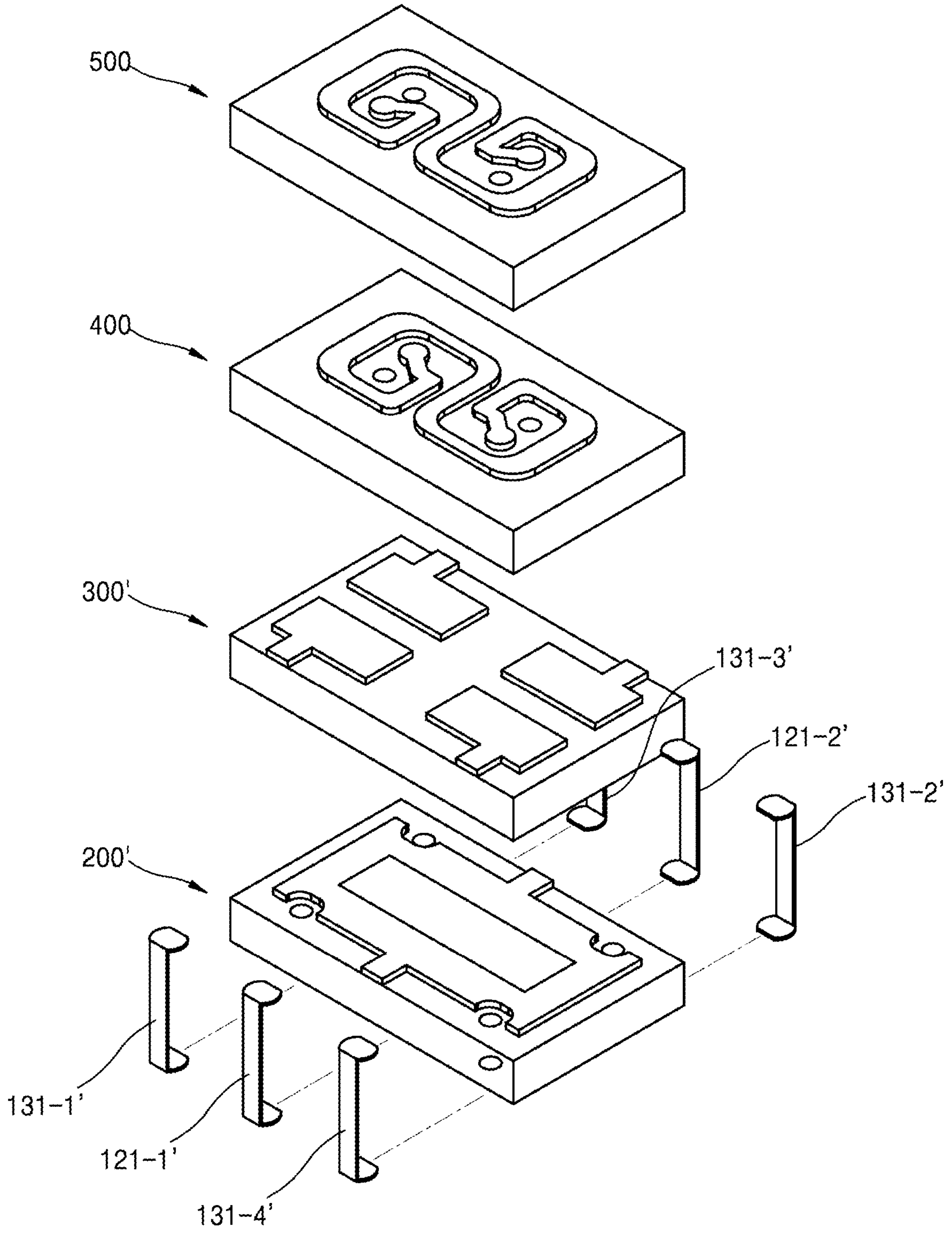
FIG. 18 is an exploded perspective view of a coupler according to another embodiment of the present invention.

FIG. 17 is a perspective view showing a coupler 2000 according to another embodiment of the present invention, and FIG. 18 is an exploded perspective view thereof. Referring to FIG. 18, the coupler 2000 is formed by sequentially stacking second to fifth sheets 200', 300', 400, and 500.

In this case, ground electrodes 121-1' and 121-2' and port electrodes 131-1', 131-2', 131-3', and 131-4' of the coupler 2000 may be formed in an overall "C" shape to at least partially wrap around one side or the other side of a coupler body 20. A ground pattern 210' may be directly connected to the ground electrodes 121-1' and 121-2', and a feeding line 310' may be directly connected to the port electrodes 131-1', 131-2', 131-3', and 131-4'.

The ground patterns, feeding lines, and coupling lines of the couplers 1000 and 2000 according to the various embodiments of the present invention described above may be appropriately redesigned in terms of line width, shape, and position within the range that reflects the technical features specified in this specification, depending on the required type and characteristics of the coupler.

Hereinafter, a manufacturing method for a coupler according to an embodiment of the present invention will be described with reference to FIGS. 19 to 22.

Figure 19:
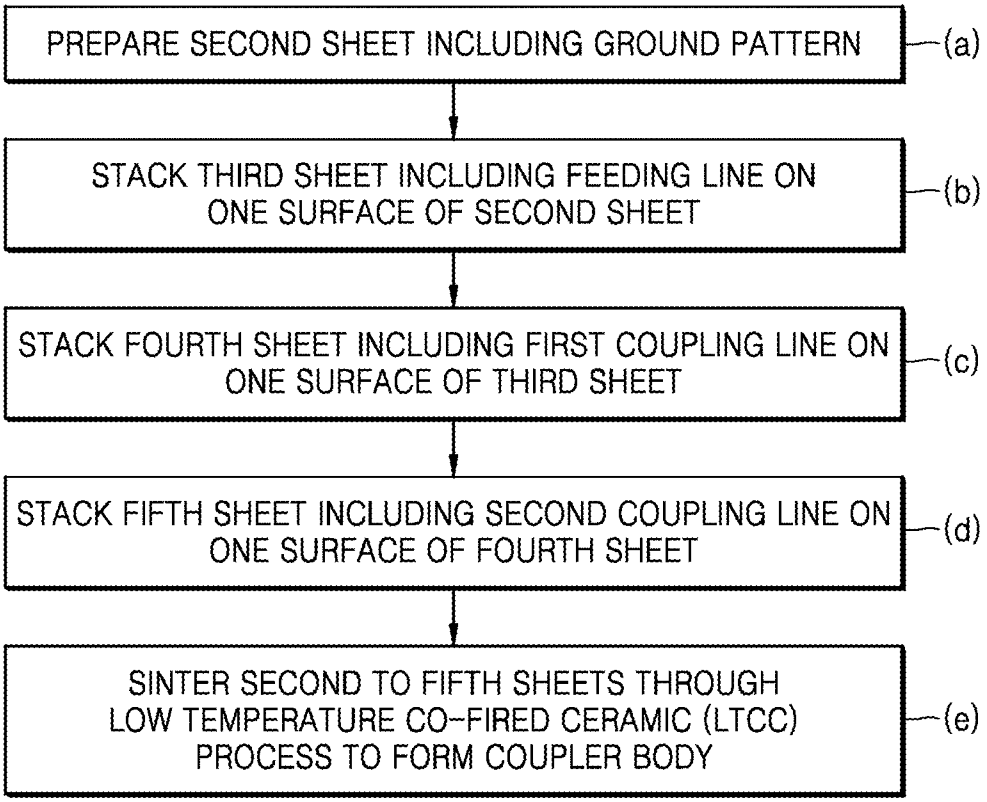
FIG. 19 is a flowchart sequentially showing each step of a manufacturing method for a coupler according to an embodiment of the present invention.

As shown in FIG. 19, the manufacturing method for a coupler according to an embodiment of the present invention may include the steps of: (a) preparing a second sheet including a ground pattern; (b) stacking a third sheet including a feeding line on one surface of the second sheet; (c) stacking a fourth sheet including a first coupling line on one surface of the third sheet; (d) stacking a fifth sheet including a second coupling line on one surface of the fourth sheet; and (e) sintering the second to fifth sheets through a LTCC process to form a coupler body.

At this time, the first coupling line and the feeding line may be connected to each other through a plurality of internal via holes having a first cross-sectional area, and the feeding line may be formed to have a second cross-sectional area that satisfies a range of 4 to 150 times the first cross-sectional area.

Figure 20:
FIGS. 20, 21, and 22 are diagrams showing other steps of a manufacturing method for a coupler according to an embodiment of the present invention.

In addition, as shown in FIG. 20, to manufacture the coupler 1000 according to a first embodiment of the present invention described above, the method may further include, before step (a), the step of (f) preparing a first sheet including ground electrodes and port electrodes for external power connection on the other surface of the second sheet. In this case, step (e) may be the step of sintering the first to fifth sheets to form the coupler body.

Figure 21:
Figure 22:
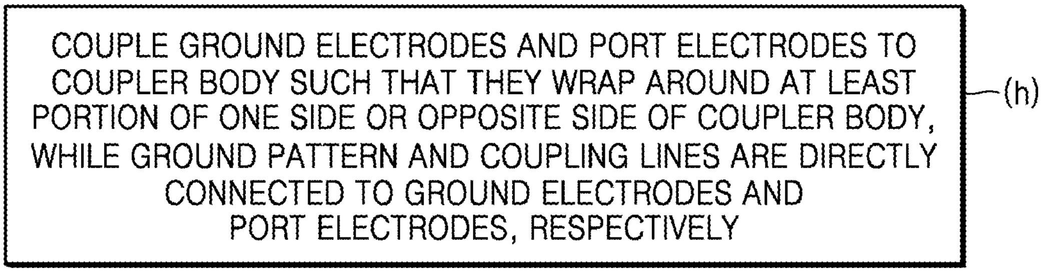

Additionally, as shown in FIGS. 21 to 22, to manufacture the coupler 2000 according to the second embodiment of the present invention described above, the method may further include, after step (e), the steps of (g) preparing ground electrodes and port electrodes, and (h) coupling the ground electrodes and the port electrodes to the coupler body such that they wrap around at least a portion of one side or the opposite side of the coupler body, while the ground pattern and the coupling lines are directly connected to the ground electrodes and the port electrodes, respectively.

Figure 23:
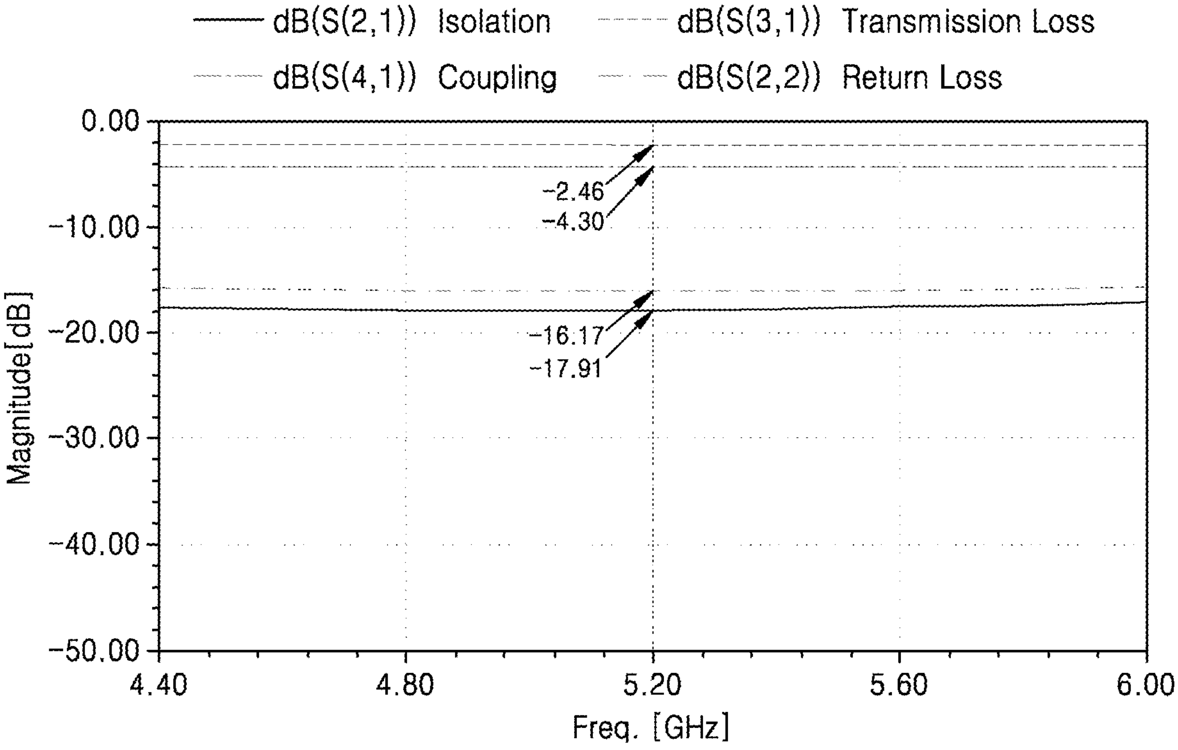
FIGS. 23 and 24 are graphs showing the performance of a coupler according to a related art.
Figure 24:
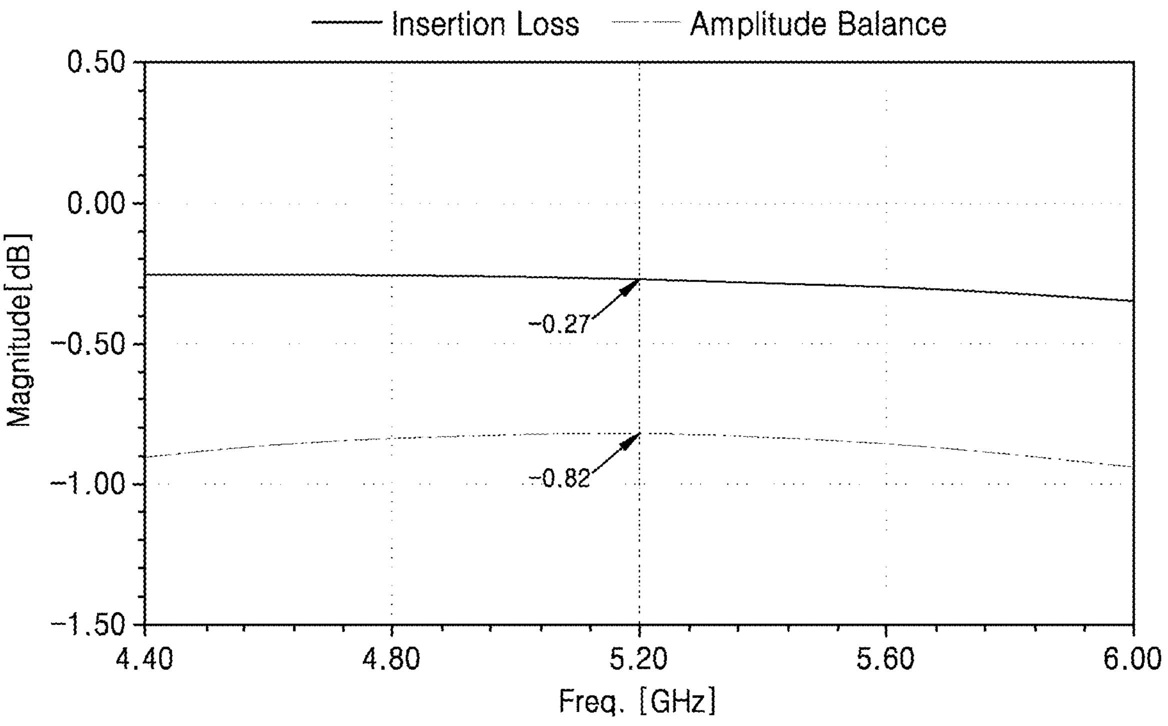
Figure 25:
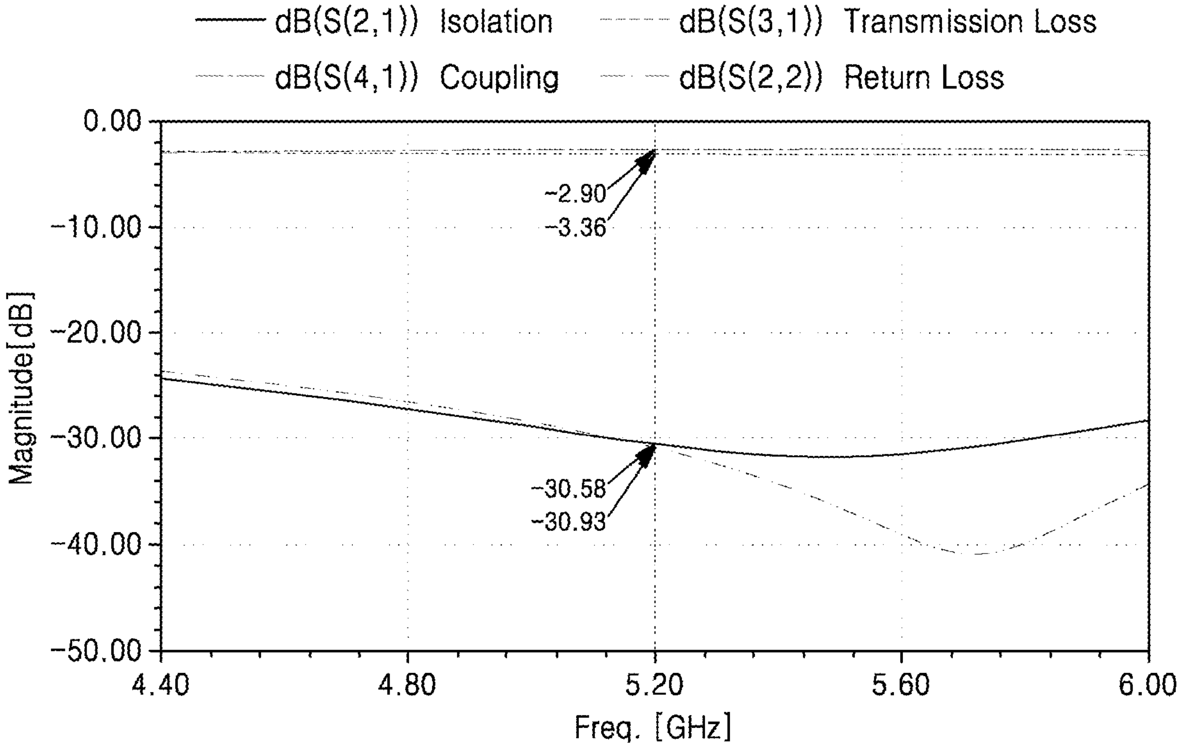
FIGS. 25 and 26 are graphs showing the performance of a coupler according to an embodiment of the present invention.
Figure 26:
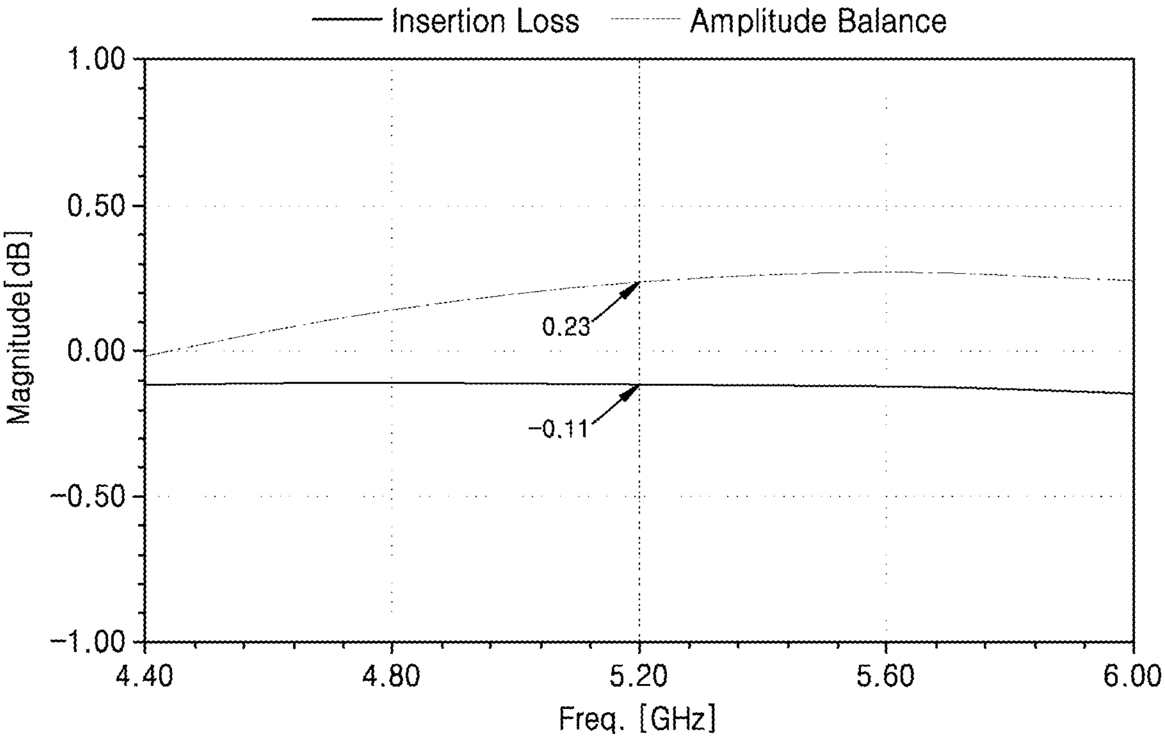

FIGS. 23 to 24 are graphs showing the performance of a coupler according to a related art, and FIGS. 25 to 26 are graphs showing the performance of a coupler according to an embodiment of the present invention.

Here, the electrical characteristics are compared with those of a conventional coupler in which ground patterns are located on both the upper and lower sides, relative to the coupling line within the body while a feeding line is not included inside.

Referring to FIGS. 23 to 24, at a 5.2 GHz frequency band, the coupler of a related art shows a coupling performance of −4.30 dB, a transmission loss of −2.46 dB, a return loss of −16.17 dB, an isolation of −17.91 dB, an amplitude balance of −0.82 dB, and an insertion loss of −0.27 dB.

On the other hand, as shown in FIGS. 25 and 26, the coupler according to an embodiment of the present invention shows a coupling performance of −2.90 dB, a transmission loss of −3.36 dB, a return loss of −30.93 dB, an isolation of −30.58 dB, an amplitude balance of +0.23 dB, and an insertion loss of −0.11 dB.

That is, the coupler according to an embodiment of the present invention may increase the coupling value of the coupling line by excluding an upper ground pattern, and at the same time, match the parallel capacitance value using the feeding line. Thus, it is possible to adjust the coupling strength to be strong even if the length of the coupling line is short and improve the amplitude balance to near zero compared to the coupler of the related art while simultaneously enhancing isolation and reducing transmission loss and insertion loss.

In addition, FIGS. 27 to 32 are graphs showing the electrical characteristics measured by varying the area of the feeding line of the coupler according to an embodiment of the present invention. For the measurement, a coupler with a size of 2.0 mm in width and 1.25 mm in length and an internal via hole with a diameter of 80 μm is used. The electrical characteristics are measured by gradually increasing the area, starting from the area of the shortest straight line connecting the port via hole and the internal via hole.

Figure 27:
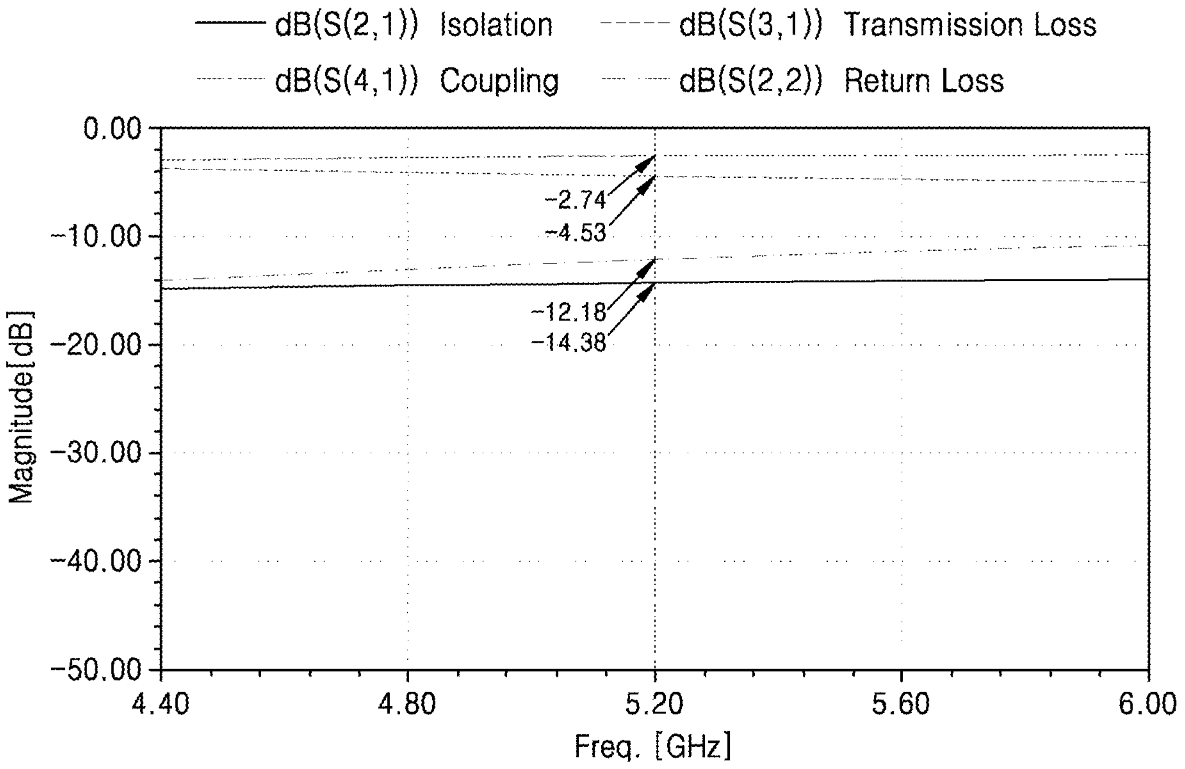
FIGS. 27, 28, 29, 30, 31, and 32 are graphs showing the electrical characteristics measured by varying the area of the feeding line of the coupler according to an embodiment of the present invention.
Figure 28:
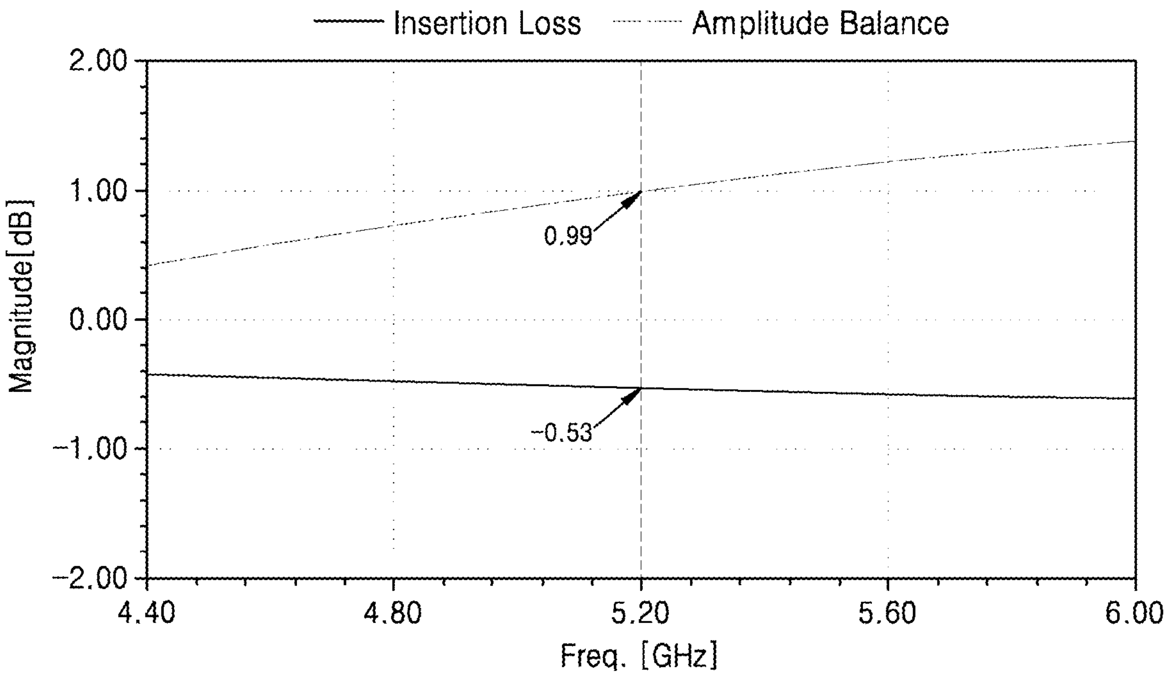

First, FIGS. 27 and 28 are graphs showing the electrical characteristics when the area of the feeding line is less than 4 times the area of the internal via hole (approximately 2.24 times). As shown in FIGS. 27 and 28, the coupler according to an embodiment of the present invention, when the area of the feeding line is less than 4 times the area of the internal via hole, exhibits a coupling performance of −2.74 dB, a transmission loss of −4.53 dB, a return loss of −12.18 dB, an isolation of −14.38 dB, an insertion loss of −0.53 dB, and an amplitude balance of +0.99 dB.

Figure 29:
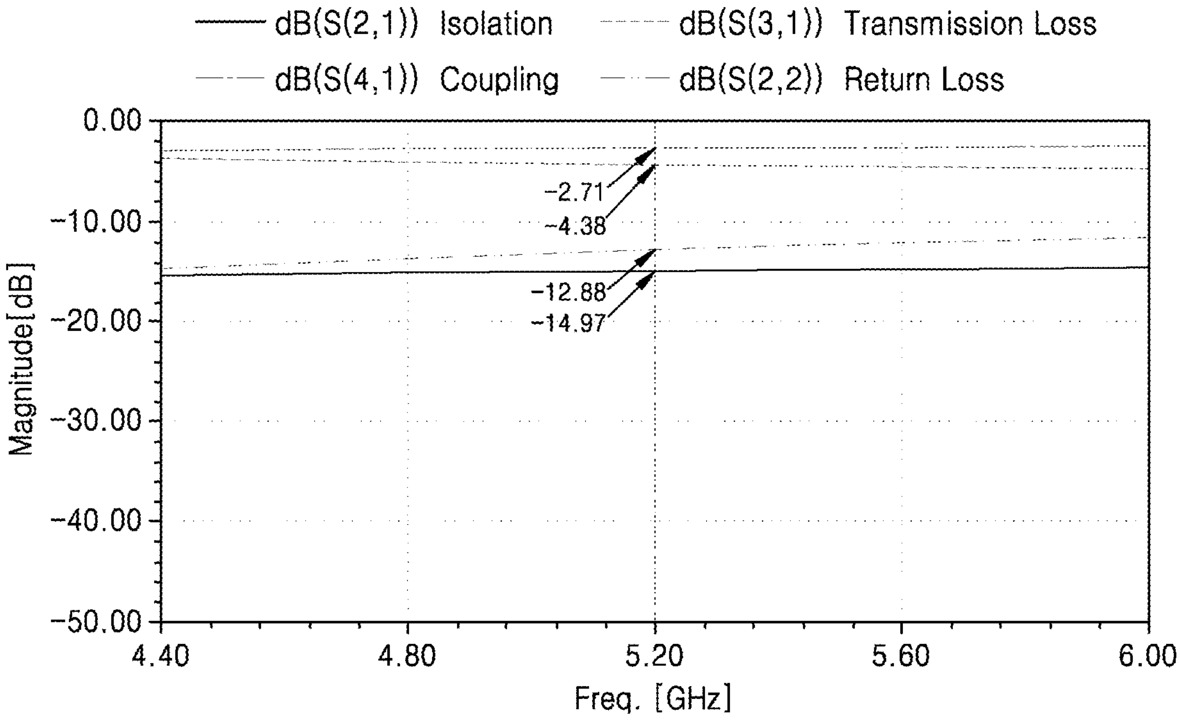
Figure 30:
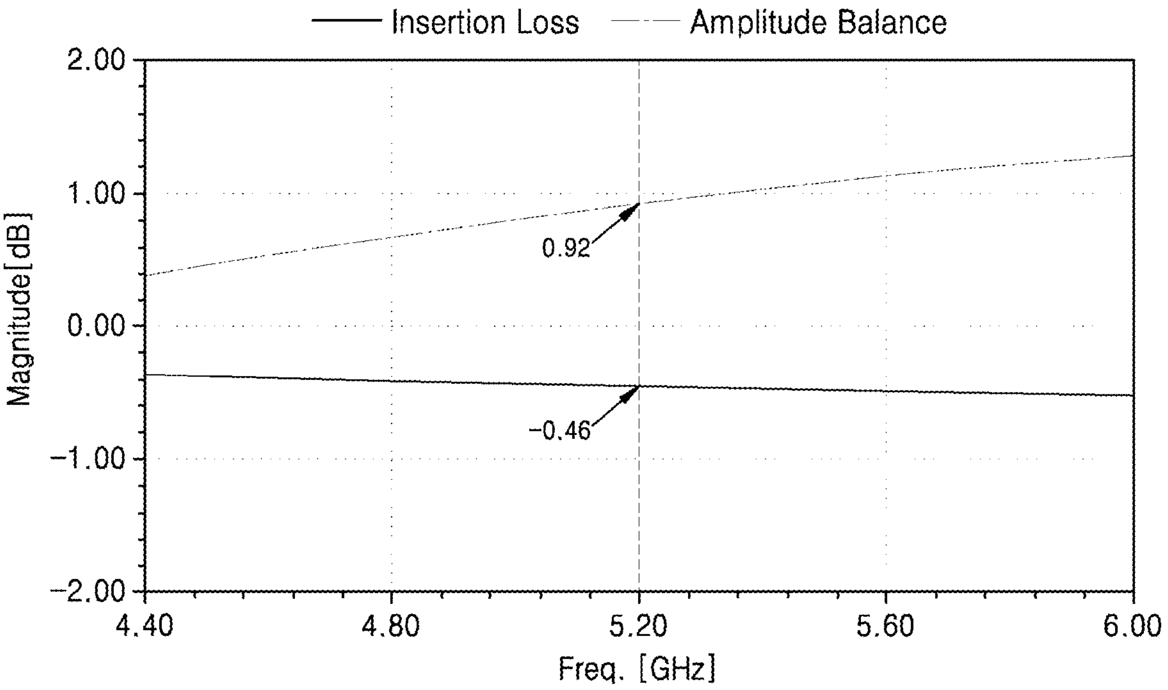

On the other hand, according to FIGS. 29 and 30, which show the electrical characteristics when the area of the feeding line is approximately 4 times the area of the internal via hole, the coupler exhibits a coupling performance of −2.71 dB, a transmission loss of −4.38 dB, a return loss of −12.88 dB, an isolation of −14.97 dB, an insertion loss of −0.46 dB, and an amplitude balance of +0.92 dB.

Figure 31:
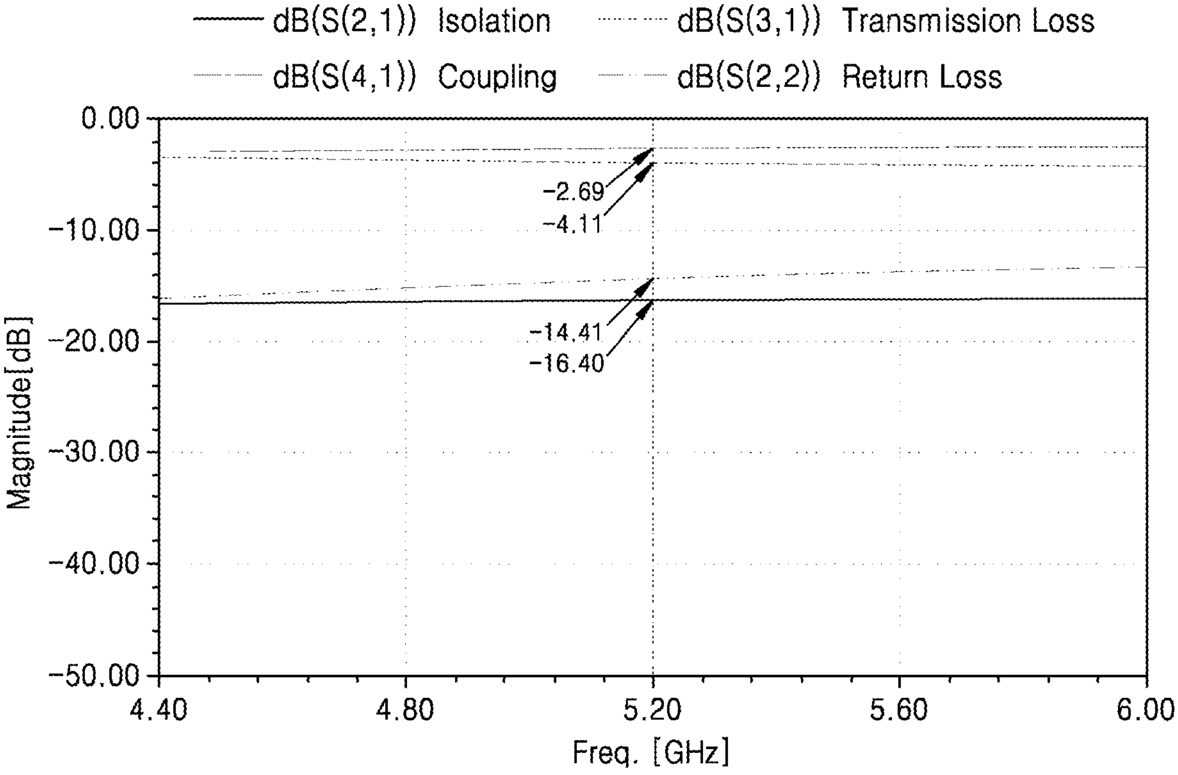
Figure 32:
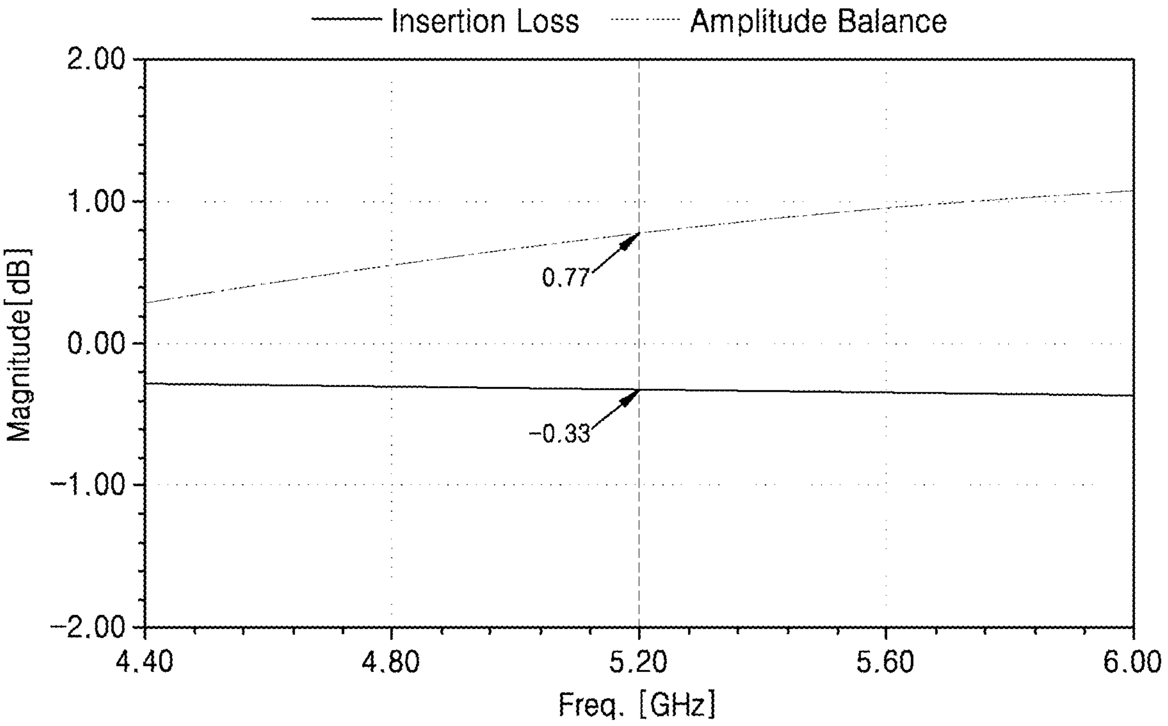

Additionally, according to FIGS. 31 and 32, which show the electrical characteristics when the area of the feeding line is approximately 10 times the area of the internal via hole, the coupler exhibits a coupling performance of −2.69 dB, a transmission loss of −4.11 dB, a return loss of −14.41 dB, an isolation of −16.40 dB, an insertion loss of −0.33 dB, and an amplitude balance of +0.77 dB.

As such, when the area of the feeding line is approximately 4 times or more the area of the internal via hole, it is confirmed that the capacitance reduction compensation effect due to the absence of the upper ground pattern is achieved and the overall electrical characteristics are improved.

According to an embodiment of the present invention, as described above, by excluding the upper ground pattern, the coupling value of the coupling line is increased, and at the same time, the parallel capacitance value can be matched using the feeding line. Accordingly, it is possible to adjust the coupling strength even if the length of the coupling line is short and there are limitations in implementing the width (interlayer thickness) and spacing between the coupling lines. Additionally, it is possible to improve the amplitude balance compared to the couplers of the related art, while simultaneously enhancing isolation and reducing transmission loss and insertion loss. However, the above effects do not limit the scope of the present invention.

While the present invention has been particularly shown and described with reference to embodiments thereof, it will be understood by those of ordinary skill in the art that various changes in form and details may be made therein without departing from the spirit and scope of the present invention as defined by the following claims. Therefore, the scope of the present invention should be defined only by the appended claims.

What is claimed is:

1. A coupler comprising:

a coupler body including ground electrodes and port electrodes for external power connection;

a ground pattern located inside the coupler body and electrically connected to the ground electrodes;

a coupling line located inside the coupler body and electrically connected to the port electrodes; and a feeding line located inside the coupler body and configured to connect the coupling line to the port electrodes, wherein the coupling line and the feeding line are connected to each other through a plurality of internal via holes each having a first cross-sectional area, and the feeding line has a second cross-sectional area that satisfies a range of 4 to 150 times the first cross-sectional area.

2. The coupler of claim 1, wherein the feeding line is located between the ground pattern and the coupling line.

3. The coupler of claim 1, wherein the feeding line is positioned such that one side thereof overlaps with at least a portion of the coupling line and the other side thereof overlaps with at least a portion of the ground pattern.

4. The coupler of claim 1, wherein the ground pattern is positioned either above or below the coupling line, but not above and below the coupling line within the coupler body.

5. The coupler of claim 1, wherein the coupling line comprises:

a first coupling line at least a portion of which is formed as a spiral line; and a second coupling line formed in a shape corresponding to the first coupling line.

6. The coupler of claim 5, wherein the spiral line comprises:

a first spiral line formed in a shape wound in one direction; and a second spiral line formed in a shape wound in an opposite direction to the first spiral line.

7. The coupler of claim 6, wherein the first spiral line comprises:

a 1st line;

a 2nd line extending in a direction bent at a predetermined angle from the 1st line;

a 3rd line extending in a direction bent at a predetermined angle from the 2nd line; and a 4th line extending in a direction bent at a predetermined angle from the 3rd line.

8. The coupler of claim 7, wherein the 3rd line is formed to have a thicker width than the 2nd line or the 4th line.

9. The coupler of claim 6, wherein the feeding line comprises a first feeding line formed in an overall rectangular shape and configured to electrically connect a 1st line and a first port electrode of the port electrodes.

10. The coupler of claim 9, wherein the first feeding line is connected to the 1st line at a portion corresponding to one edge of the first feeding line and to the first port electrode at a portion corresponding to the other edge of the first feeding line.

11. The coupler of claim 5, wherein the coupler body comprises:

a second sheet including the ground pattern;

a third sheet including the feeding line;

a fourth sheet including the first coupling line; and a fifth sheet including the second coupling line.

12. The coupler of claim 11, wherein the ground electrodes and the port electrodes are formed on a bottom surface of the coupler body, the ground electrodes and the ground pattern are connected to each other through a plurality of ground via holes, and the port electrodes and the feeding line are electrically connected to each other through a plurality of internal via holes.

13. The coupler of claim 12, wherein the coupler body further comprises a first sheet including the ground electrodes and the port electrodes.

14. The coupler of claim 11, wherein the ground electrodes and the port electrodes are formed to wrap around at least a portion of one side or the other side of the coupler body, the ground pattern is directly connected to the ground electrodes, and the feeding line is directly connected to the port electrodes.

15. The coupler of claim 1, wherein the ground pattern is formed in an overall rectangular shape with a hollow center.

16. The coupler of claim 15, wherein the coupling line is positioned to overlap with at least a portion of the ground pattern.

17. The coupler of claim 15, wherein the coupling line is positioned in the hollow center of the ground pattern so as not to overlap with the ground pattern.

18. A manufacturing method for a coupler, comprising the steps of:

preparing a second sheet including a ground pattern;

stacking a third sheet including a feeding line on the second sheet;

stacking a fourth sheet including a first coupling line on the third sheet;

stacking a fifth sheet including a second coupling line on the fourth sheet;

sintering the second to fifth sheets through a low temperature co-fired ceramic (LTCC) process to form a coupler body;

preparing ground electrodes and port electrodes; and coupling the ground electrodes and the port electrodes to the coupler body such that the ground electrodes and the port electrodes wrap around at least a portion of one side or the opposite side of the coupler body, while the ground pattern and the coupling lines are directly connected to the ground electrodes and the port electrodes, respectively.

* * * * *